United States Patent [19]

Suzuki et al.

[11] 4,309,471

[45] Jan. 5, 1982

[54] MAGNETIC AUDIO-RECORDING TAPE

[75] Inventors: Masaaki Suzuki; Masashi Aonuma; Yasuo Tamai, all of Odawara, Japan

[73] Assignee: Fuji Photo Film Co., Ltd., Kanagawa, Japan

[21] Appl. No.: 46,280

[22] Filed: Jun. 7, 1979

[30] Foreign Application Priority Data

Jun. 7, 1978 [JP] Japan ................................ 53/68637

[51] Int. Cl.³ ............................................. G11B 5/70
[52] U.S. Cl. .................................. 428/141; 360/134; 428/150; 428/329; 428/335; 428/336; 428/337; 428/694; 428/900; 428/409
[58] Field of Search ............... 428/900, 409, 480, 483, 428/694, 695, 141, 143, 147, 150, 329, 335, 336, 337; 427/127, 128; 360/131, 134, 135, 136

[56] References Cited

U.S. PATENT DOCUMENTS 4,153,920  5/1979  Shirahata et al. ................. 428/900
4,187,343  2/1980  Yamaguchi et al. ............... 428/500

Primary Examiner—Stanley S. Silverman
Attorney, Agent, or Firm—Sughrue, Mion, Zinn, Macpeak & Seas

[57] ABSTRACT

A magnetic audio-recording tapes based on finely-divided ferromagnetic alloy materials are disclosed which have improved surface characteristics. The improvement of recording and playback characteristics is specifically exhibited in a reduction in modulation noise.

7 Claims, 3 Drawing Figures

MAGNETIC AUDIO-RECORDING TAPE

BACKGROUND OF THE INVENTION

1. Field of the Invention

This invention relates to magnetic recording tapes for audio use, and particularly to those tapes having audio recording and reproducing characteristics with high fidelity.

2. Description of the Prior Art

Typical magnetic audio-recording tape formats include tapes ¼ inch (6.25 mm) wide and about 18 to 35 microns thick for open reel tapes and tapes about 3.8 mm wide and about 9 to 18 microns thick installed in Philips type compact cassettes. Tapes of these formats can also be installed in EL cassettes, micro cassettes, Lear jet type endless cartridges, etc. Such a tape comprises a non-magnetizable flexible support about 4 to 23 microns thick and a magnetic coating layer about 2 to 12 microns thick. The magnetic coating layer contains ferromagnetic particles comprising $\gamma$-$Fe_2O_3$, $Fe_3O_4$, both of which may be used in pure form or with the incorporation of Co, $CrO_2$, etc. Such a magnetic coating layer has a coercive force of about 250 to 600 Oe and residual magnetization of about 1,000–1,700 Gauss.

New magnetic coating layer formulations comprising ferro-magnetic alloys dispersed in a binder have been proposed such as those set forth in Japanese Patent Applications (OPI) Nos. 43111/1976, 65905/1976, 97800/1976, 101502/1976, 140200/1976, 56508/1977, 56511/1977, 108804/1977 (which corresponds to Canadian Pat. No. 959,979 and OLS No. 2,710,268), 11967/1978 and 13906/1978 (The term "OPI" as used herein refers to a "published unexamined Japanese patent application".), Japanese Patent Application No. 154491/1976, etc. A magnetic coating layer containing a finely-divided ferromagnetic alloy exhibits a high coercive force as well as a high residual magnetization which is effective to expand the dynamic range (the range between the maximum recorded sound level and the bias noise level) and provide high fidelity recording and reproduction characteristics when used in audio recording. The ferromagnetic alloy coating layers comprising a finely-divided metal alloy dispersed in a binder can be manufactured stably and are capable of providing a magnetic audio-recording material having a coercive force of 800 to 1300 Oe and a residual magnetization of 2500 to 4000 Gauss. In comparison to conventional types of magnetic coating layers, coating layers based on the alloys have more than twice as high coercive force and residual magnetization, which would lead one to expect an improvement in dynamic range by at least as much as 6 dB. In practical embodiments, the thickness of the magnetic coating layer can be reduced which unfavorably works for the improvement of dynamic range at the lower frequency region but which favorably works at the higher frequency region since the tape coating thickness loss (See, for example, "Radio Technics Series", Vol. 16, "Hi-Fi Tape Recorder", pp. 138, published by Radio Technics Co. (Rajio-gijutsu-sha) 1969.) is reduced. Hence the magnetic audio-recording tape comprising a finely-divided ferromagnetic metal alloys dispersed in a binder has markedly improved properties and particularly a wide dynamic range towards high frequency regions.

However, when a music program is recorded in and played back from such an metal alloy tape, the listener does not sense the resulting sound as having an expanded dynamic range primarily because the modulation noise level of the metal alloy based magnetic tape is greater than that of the conventional tapes. The increase in the modulation noise level is presumably attributed to the surface roughness or the non-uniformity of the magnetic coating layer, which is suitable for conventional coating formulations but which, when combined with the higher residual magnetization of metal alloy coatings, gives rise to an unacceptable level of magnetic fluctuation.

Further experiments have revealed that modulation noise can be effectively suppressed by improving the uniformity of either the surface of the magnetic coating which faces the magnetic head or the surface contiguous to the tape support. Specifically it has been confirmed that, in the manufacture of a tape by coating a dispersion of a finely-divided magnetic material in a binder on a support and then drying, the surface uniformity of the magnetic coating can be markedly improved by improving the smoothness of the support surface on which the magnetic coating layer is to be provided.

SUMMARY OF THE INVENTION

Accordingly, it is a principal object of the present invention to provide a magnetic audio-recording tape based on finely-divided ferromagnetic alloy powders producing reduced modulation noise.

It is another object of the present invention to provide a magnetic audio-recording tape which can be installed in Philips type compact cassettes, EL cassettes, micro cassettes, Lear jet type endless cartridges, etc.

DETAILED DESCRIPTION OF THE INVENTION

In order that the reduction of modulation noise exceeds the increment in the dynamic range achieved using the metal alloy coating in place of the conventional one (not less than 6 dB), the roughness (the average wavelength distribution of the surface roughness) of the non-magnetizable support on which the magnetic coating is applied must not exceed 0.1 micron, while 0.2 microns is permitted for the conventional audio-recording tapes. Accordingly, in the instant invention a magnetic audio-recording tape is disclosed which is subjected to analog recording by A.C. biasing, comprising a non-magnetizable flexible film support and at least one magnetic coating layer provided on said support, wherein (a) the roughness of the support surface on which said magnetic coating layer is formed does not exceed 0.1 micron, and (b) said magnetic coating layer comprises a finely-divided ferromagnetic metal alloy dispersed in a binder.

Figure 1:
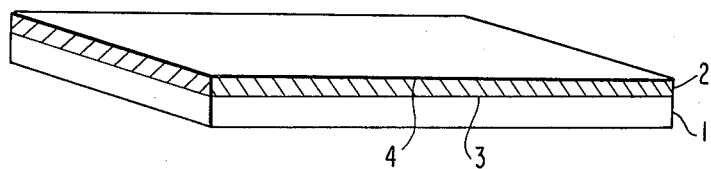
FIG. 1 illustrates a magnetic recording tape prepared in accordance with the present invention.

The present invention will now be explained with reference to the accompanying drawings. FIG. 1 is a perspective view of an ordinary magnetic recording tape in which a non-magnetizable flexible support 1 the surface 3 of which is coated with a magnetic coating layer 2 having a surface 4.

The non-magnetizable flexible support 1 should have a thickness of from about 4 to 32 μm and preferably 4 to 23 μm, and desirably comprises a material such as a polyester (e.g., poly(ethylene terephthalate), polyethylene-2,6-naphthalate, etc.), a cellulose derivatives (e.g., cellulose triacetate, cellulose diacetate, etc.), a polyolefin (e.g., polypropylene, etc.), a polycarbonate, a polyamide, etc.

The surface roughness of the non-magnetizable flexible support which can be used in the present invention can be attained by the methods described in Japanese Patent Publication No. 6765/1975, Japanese Patent Applications (OPI) Nos. 74910/1974, 3308/1975, 25206/1975, 56467/1975, 10912/1976, 49275/1976, 81881/1976, 84264/1977, etc.

The surface of the non-magnetizable flexible support may be modified if required. One such modification is to coat the surface with a polymer coating using binder materials and/or lubricants both of which will be described later in the explanation of the magnetic coating composition.

The ferromagnetic metal alloy powders used in the present invention are finely-divided, ferromagnetic metal or metal alloys preferably having a particle size about 500 Å in terms of their mean short axis length, and more preferably of from about 150 to 500 Å, and having a mean axial ratio (long axis length to short axis length) of not less than about 3, and more preferably from about 3 to 12. Further, in order to achieve a marked increase in magnetic flux density (Br) in contrast to (Br) of conventional iron oxide ferromagnetic material (from about 4500 to 5000 Gausses), they should comprise metal in an amount of not less than about 75 wt%, and more preferably not less than 80 wt%. Within the aforementioned metal content range not less than 80 wt%, and more preferably about 85 to 100 wt% should be ferromagnetic metal alloys containing at least one metal atom selected from the group consisting of Fe, Co and Ni. Specifically, the ferromagnetic ingredient usually comprises Fe, Fe—Co, Fe—Ni or Fe—Co—Ni. The Fe content of the metals should not be less than about 50 wt% and more preferably be between 70 and 100 wt%. The remainder of the metal content comprises Co, Ni, or Co—Ni the content of which correspondingly amounts to up to 50 wt% and preferably 0 to 30 wt%. The ferromagnetic metal alloy powders may contain, in addition to ferromagnetic metals, non-magnetic metals or non-metallic elements. The non-magnetic metals are contained therein at a concentration up to about 10 wt% and more preferably between about 0.05 and 5 wt%. The non-metallic element are contained therein at a content of about 0.1 to 10 wt%, and more preferably 0.1 to 5 wt%. Suitable non-magnetic and non-metallic elements include B, C, N, Al, Si, P, S, Ti, Cr, Mn, Cu, Zn, Mo, Pd, Ag, Sn, Sb, Ba, La, Ce, Sm, W, Pb, etc. Two or more of these elements may be simultaneously used.

The ferromagnetic metal alloys used in the present invention have magnetic flux densities $(B_m)$ of from about 9000 to 14000 Gauss and a coercive force of from about 750 to 1600 Oe, preferably from 800 to 1300 Oe.

The following six manufacturing methods may be used for the production of such ferromagnetic metal alloy powders.

(1) Thermal decomposition of the ferromagnetic metal salt of an organic acid followed by reduction of the decomposed product in a reducing gas atmosphere as described in, for example, Japanese Patent Publications Nos. 11412/1961, 22230/1961, 14809/1963, 3807/1964, 8026/1965, 8027/1965, 15167/1965, 16899/1965 (corresponding to U.S. Pat. No. 3,186,829), 12096/1966, 14818/1966 (corresponding to U.S. Pat. No. 3,190,748), 24032/1967, 3221/1968, 22394/1968, 29268/1968, 4471/1969, 27942/1969, 38755/1971, 38417/1972, 41158/1977, 29280/1973, Japanese Patent Applications (OPI) Nos. 38523/1972 and 88599/1975, etc.

(2) Reduction of a needle-shaped oxyhydroxide in pure form or incorporated with foreign metals, or of needle-shaped iron oxide obtained from such an oxyhydroxide as described in, for example, Japanese Patent Publications Nos. 3862/1960, 11520/1962, 20335/1964, 20939/1964, 24833/1971, 29706/1972, 30477/1977 (corresponding to U.S. Pat. No. 3,598,568), 39477/1977, 24952/1973, and 7313/1974, Japanese Patent Applications (OPI) Nos. 5057/1971 (corresponding to U.S. Pat. No. 3,634,063), 7153/1971, 79153/1973, 82395/1973, 97738/1974, 24799/1975, 5179/1976, and 77900/1976, U.S. Pat. Nos. 3,607,219, 3,607,220 and 3,702,270, etc.

(3) Evaporation of a ferromagnetic metal in an inert gas atmosphere under reduced pressure as described in, for example, Japanese Patent Publications Nos. 25620/1971, 4131/1972, 27718/1972, 15320/1974, 18160/1974, and 36103/1977, Japanese Patent Applications (OPI) Nos. 25662/1973, 25664/1973, 25665/1973, 31166/1973, 55400/1973 and 81092/1973, etc.

(4) Thermal decomposition of a metal carbonyl compound as described in, for example, Japanese Patent Publications Nos. 1004/1964, 3415/1965, 16868/1970 and 26799/1974, U.S. Pat. Nos. 2,983,997, 3,172,776, 3,200,007 and 3,228,882, etc.

(5) Electrolytic deposition of a ferromagnetic metal powder on a mercury cathode, followed by separation thereof from the mercury as described in, for example, Japanese Patent Publications No. 12910/1960, 3860/1961, 5513/1961, 787/1964, 15525/1964, 8123/1965, 9605/1965 (corresponding to U.S. Pat. No. 3,198,717), and 19661/1970 (corresponding to U.S. Pat. No. 3,156,650), U.S. Pat. No. 3,262,812, etc.

(6) Reduction of a ferromagnetic metal salt dissolved in a solvent by the addition of a suitable reductant as described in, for example, Japanese Patent Publications Nos. 20520/1963, 26555/1963, 20116/1968, 9869/1970, 14934/1970, 7820/1972, 16052/1972, 41718/1972, 41719/1972 (corresponding to U.S. Pat. No. 3,607,218), Japanese Patent Applications (OPI) Nos. 1353/1972, (corresponding to U.S. Pat. No. 3,756,866), 42252/1972, 42253/1972, 44194/1973, 79754/1973 (corresponding to U.S. Pat. No. 4,059,463), 82396/1973, 43604/1974, 99004/1974, 41899/1974, 18345/1975, 19667/1975, 41097/1975 (corresponding to U.S. Pat. No. 3,966,510), 41506/1975 (corresponding to U.S. Pat. Nos. 3,943,012 and 4,009,111), 41756/1975, 72858/1975, 72859/1975, 78896/1975 (corresponding to U.S. Pat. No. 4,007,072), 79800/1975, 104397/1975 (corresponding to U.S. Pat. No. 4,020,236), 106198/1975, 160161/1975, 33758/1976 (corresponding to U.S. Pat. No. 4,063,000), 42990/1976 (corresponding to U.S. Pat. No. 4,069,073), 80998/1976 (corresponding to U.S. Pat. No. 4,076,861), U.S. Pat. Nos. 3,206,338, 3,494,760, 3,535,104, 3,567,525, 3,661,556, 3,663,318, 3,669,643, 3,672,867 and 3,726,664, etc.

The finely-divided ferromagnetic metal alloy material used in the instant invention is desirably manufactured according to the second, third or sixth methods described above. A more detailed explanation on the production method of such ferromagnetic metal alloys can be found in Japanese Patent Application No. 43864/1978.

In the production of a magnetic recording medium with the above-described ferromagnetic metal alloy material, the ferromagnetic material should be surface-treated in an aqueous solution to render its surface hydrophobic, followed by transfer to an organic solvent medium. Then the alloy powder is mixed with and dispersed in a binder and other ingredients to give a magnetic coating composition which can be applied onto a support to provide a magnetic coating layer. In case where the magnetic recording medium is prepared with a water soluble binder, the finely-divided ferromagnetic metal alloy material is subjected to surface treatment directly or in an aqueous solution, dehydrated, and then mixed with a water soluble resin binder to give a magnetic coating composition, which is spread over the support to prepare the magnetic recording medium.

Transfer of surface-treated ferromagnetic metal alloy materials from an aqueous medium to an organic solvent can be carried out by any of the following methods.

Solvent replacement method: Addition of a water-miscible organic solvent into the aqueous solution containing an anionic surfactant results in the substitution of the water contained in the microporous structure of the ferromagnetic material with the organic solvent. When one needs a different solvent for coating, the substituted, first solvent is further replaced with the coating solvent.

Flushing replacement method: In contrast to the first method, the water content surrounding the alloy powder is substituted by a water-immiscible organic solvent, which is replaced with a coating solvent, if necessary.

Vacuum drying method: After being vacuum dried, the alloy material is dispersed in an organic solvent.

Inert gas drying method: After being dried in an inert gas such as $N_2$, Ne, Ar, Kr, etc., the alloy material is dispersed in an organic solvent.

Azeotropic distillation method: An azeotropic mixture with a minimum distillation point associated with water is distilled by adding a suitable organic solvent in a mixing ratio of from 30/1 to 1/100 whereby the whole amount of water is expelled in the form of an organic solvent/water azeotropic mixture.

Equilibrium distillation method: The water content is nullified by carrying out equilibrium distillation with the use of an organic solvent having a boiling point higher than water and incapable of forming an azeotropic mixture with water.

Detailed descriptions of these methods are found in U.S. Pat. No. 4,076,861, Japanese Patent Applications (OPI) Nos. 104903/1975, 43111/1976, and 128505/1976, Japanese Patent Application No. 43864/1978, etc.

The ferromagnetic metal alloy powder having been transferred into an organic medium may be dried in nitrogen, an inert gas or in air. Otherwise, it may be immersed in an organic solvent. A magnetic recording material can be prepared by blending the thus surface-treated ferromagnetic alloy powder with a binder and other ingredients, which is then spread over a support and dried. The resulting coated product can be used as a recording medium in the form of a tape, a disc, a sheet or card.

Magnetic coating compositions containing ferromagnetic alloy materials can be prepared by reference to Japanese Patent Publications Nos. 15/1960, 26794/1964, 186/1968, 28043/1972, 28045/1972, 28046/1972, 28048/1972, 31445/1972, 11162/1973, 21331/1973 and 33683/1973, U.S.S.R. Pat. No. 308,033 (S. I. Omelchenko, et al), etc. Such magnetic coating compositions contain, in some cases, in addition to the finely-divided ferromagnetic metal alloy, binder and coating solvent, a dispersing aid, a lubricant, an abrasive antistatic agent, etc.

The binder used in the instant invention includes all polymer materials conventionally used for the purpose such as thermoplastic, thermosetting or reactive binders. Two or more materials may be used together.

Thermoplastic resins should preferably have a softening point not higher than 150° C., a weight average molecular weight of from 10,000 to 200,000 and a degree of polymerization of from about 200 to 2000 and include, for example, vinyl chloride/vinyl acetate copolymer, vinyl chloride/vinylidene chloride copolymer, vinyl chloride/acrylonitrile copolymer, acrylate ester/acrylonitrile copolymer, acrylate ester/styrene copolymer, methacrylate ester/acrylonitrile copolymer, methacrylate ester/vinylidene chloride copolymer, methacrylate ester/styrene copolymer, urethane elastomer, poly(vinyl fluoride), vinylidene chloride/acrylonitrile copolymer, butadiene/acrylonitrile copolymer, polyamide resin, poly(vinylbutyral), cellulose derivatives (e.g., cellulose acetate butyrate, cellulose diacetate, cellulose triacetate, cellulose propionate, nitrocellulose, etc.), styrene/butadiene copolymer, polyester resin, amino resin, various types of synthetic rubbers (e.g., polybutadiene, polychloroprene, polyisoprene, styrene/butadiene copolymer, etc.), and mixture thereof. Such resins are disclosed in Japanese Patent Publications Nos. 6877/1962, 12528/1964, 19282/1964, 5349/1965, 20907/1965, 9436/1966, 14059/1966, 16935/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, and 27886/1973, U.S. Pat. Nos. 3,144,352, 3,419,420, 3,499,789 and 3,713,887, etc.

Thermosetting or reactive type resins preferably have a molecular weight not higher than about 200,000 when present in the coating composition, which value grows infinite through condensation or addition reactions during coating and drying. Additionally, these resins can not soften or melt prior to thermal decomposition at elevated temperatures. Suitable materials include, for example, phenol/formaldehyde-novolac type resins, phenol/formaldehyderesol type resins, phenol/furfural resins, xylene/formaldehyde resins, urea resins, melamine, resins, drying oil modified alkyd resins, phenol/formaldehyde modified alkyd resins, maleic acid resins, modified alkyl resins, unsaturated polyester resins, epoxy resins with hardener (e.g., polyamine, acid anhydride, polyamide resin, isocyanate, etc.), isocyanate-terminated moisture curable polyester resins, isocyanate-terminated moisture curable polyether resins, polyisocyanate prepolymers (e.g., compounds having three or more isocyanate groups in the molecule obtained by the reaction of a di-isocyanate compound and a low-molecular weight triol, the trimer or tetramer of a di-isocyanate compound, etc.), polyisocyanate prepolymers in conjunction with a resin having active hydrogens (e.g., a polyester polyol, a polyether polyol, an acrylic acid containing copolymer, a maleic acid containing copolymer, a 2-hydroxyethyl methacrylate copolymer, a p-hydroxystyrene copolymer, etc.), and mixtures thereof. These resins are described in Japanese Patent Publications Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, and 28922/1972, U.S. Pat. Nos. 3,144,353, 3,320,090, 3,437,510, 3,597,273, 3,781,210 and 3,781,211, etc.

Suitable additives for the magnetic recording composition containing the ferromagnetic alloy powder include lubricants, abrasives, anti-static agents, etc.

Though the metal alloy powder prepared by vaporization method in accordance is already treated with a surfactant in an aqueous medium, use of a dispersing aid in the coating mixture is usually recommended. Suitable dispersing agents include $C_{12}$ to $C_{18}$ aliphatic acids represented by the formula $R_1COOH$ wherein $R_1$ is an alkyl or alkenyl group having 11 to 17 carbon atoms such as caprylic acid, capric acid, lauric acid, myristic acid, palmitic acid, stearic acid, oleic acid, elaidic acid, linoleic acid, linolenic acid, starolic acid, etc., metal soaps comprising the alkali metal (Li, Na, K, etc.) or alkaline earth metal (Mg, Ca, and Ba) salts of the above described aliphatic acids, esters of the above described aliphatic acids containing fluorine, amides of the above described aliphatic acids, polyalkylene oxide esters of alkylphosphoric acids, lecithin, N-acylsarcosine (the acyl group being the aliphatic acid residue of $C_{12}$ to $C_{18}$), phosphoric acid esters of alkyl(polyoxyethylene)s wherein the degree of polymerization of the polyoxyethylene is from 2 to 10 while the alkyl group has from 12 to 18 carbon atoms, etc. In addition, higher alcohols having not less than 12 carbon atoms and sulfuric acid esters thereof can be used.

The dispersing agent is usually used in an amount of from about 0.5 to 20 parts by weight per 100 parts by weight of binder. Related descriptions are found in Japanese Patent Publications Nos. 28369/1964, 17945/1969, 7441/1963, 15001/1963, 15002/1963, 16363/1963, and 4121/1975, U.S. Pat. Nos. 3,387,993 and 3,470,021, etc.

Suitable lubricants include electrically conductive fine powders comprising graphite, carbon black grafted polymer, etc., inorganic powders such as tungsten disulfide, etc., plastic powders such as polyethylene, polypropylene, ethylene/vinyl chloride copolymer, polytetrafluoroethylene, etc., paraffin and having a melting point of about 20° to 60° C., polymerized α-olefins, 1,2-epoxy alkanes, unsaturated aliphatic hydrocarbons which are liquid at room temperature (e.g., compounds having a terminal n-oleophinic double bond and having 15 to 22 carbon atoms), aliphatic acid ester comprising mono-basic aliphatic acids with 12 to 20 carbon atoms and mono-hydric alcohols with 3 to 12 carbon atoms, etc. Such a lubricant is incorporated in the composition in an amount of from about 0.2 to 20 parts by weight per 100 parts by weight of binder. Related descriptions are found in Japanese Patent Publications Nos. 18064/1966, 23889/1968, 40461/1971, 15621/1972, 18482/1972, 28043/1972, 32001/1972, and 5042/1975, U.S. Pat. Nos. 3,470,021, 3,492,235, 3,497,411, 3,523,086, 3,625,760, 3,630,772 and 3,642,539, "IBM Technical Disclosure Bulletin" Vo. 9, No. 7, pp. 779 (1966, December), "Elektronik" (1961) No. 12, pp. 380, etc.

Abrasives include those materials widely used and well known for the purposes, such as fused alumina, silicon carbide, chromium oxide ($Cr_2O_3$), corundum, synthetic corundum, diamond, synthetic diamond, garnet, emery which mainly comprises corundum and magnetite, etc. Those with a Mohs' hardness of not less than 4 and an average particle size of from about 0.05 to 5 μm, and more preferably from 0.1 to 2 μm are preferred. The abrasive is added to the composition in an amount of about 0.5 to 20 parts by weight per 100 parts by weight of binder. Related descriptions are found in Japanese Patent Publications Nos. 18572/1972, 15003/1973, 15004/1973 (corresponding to U.S. Pat. No. 3,617,378), 39402/1974 and 9401/1975, U.S. Pat. Nos. 3,007,807, 3,041,196, 3,293,066, 3,630,910, and 3,687,725, British Pat. No. 1,145,349, German Pat. Nos. 853,211 and 1,101,000.

Anti-static agents comprise electrically conductive fine powders of carbon black, carbon black grafted polymer, etc., surfactants of natural origin such as saponin, non-ionic surfactants such as alkylene oxide derivatives, glycerides, glycidol derivatives, etc., cationic surfactants such as higher alkylamines, quarternary ammonium salts, heterocyclic compounds including pyridine, phosphonium or sulfonium compounds, etc., anionic surfactants such as those containing acid groups such as carboxylic acid, sulfonic acid, phosphoric acid, sulfate ester, phosphoric acid ester, etc., amphoteric surfactants such as aminoacids, aminosulfonic acids, the sulfuric acid or phosphoric acid esters of aminoalcohols, etc. The electrically conductive fine powders may be incorporated in the magnetic coating layer in an amount of about 0.2 to 20 parts by weight, and the surfactants cited above in an amount of about 0.1 to 10 parts by weight per 100 parts by weight of binder, respectively. Representative conductive materials and surfactants preferably used as antistatic agents are disclosed in Japanese Patent Publications Nos. 22726/1971, 24881/1972, 26882/1972, 15440/1973, and 26761/1973, U.S. Pat. Nos. 2,271,623, 2,240,472, 2,228,226, 2,676,122, 2,676,924, 2,676,975, 2,691,566, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German OLS No. 1,941,665, British Pat. Nos. 1,007,317 and 1,198,450, "Synthesis and Applications of Surface Active Agents" authored by Ryohei Oda et al, published by Maki Shoten, 1955, "Surface Active Agents" by A. M. Schwartz and J. W. Paily, published by Interscience Publication, Inc., 1958, "Encyclopedia of Surface Active Agents, vol. 2" by J. P. Sisley, published by Chemical Publish Co., 1964, and "Surface Active Agent Encyclopedia" 6th edition, published by Sangyo-tosho Co., Dec. 20, 1966, etc.

Surface active agents may be used alone or in mixtures thereof. Though they are primarily used as antistatic agents, they also serve other purposes. The improved dispersion stability and magnetic characteristics are useful as lubricants or coating aids.

Magnetic coating layers can be formed by dissolving, blending or dispersing all of the above-described ingredients in organic solvents to form a coating composition and then spreading the composition on a non-magnetic support. The coating composition is then dried. During the period between coating and complete drying, additional processings may be performed such as orientation of the ferromagnetic particles and after drying, the magnetic coating layer may be subjected to surface smoothing processing. The magnetic coating layer is generally about 2 to 12 μm and preferably about 2 to 8 μm thick.

A back coating can be provided on the surface opposite to the surface of the non-magnetizable, flexible support coating with the magnetic coating layer for various purposes including static prevention, magnetic transfer prevention and wow and flutter prevention. The back coating layer usually comprises at least one additive such as a lubricant, an abrasive, an antistatic agent, etc., all of which have been described. These ingredients together with a dispersing agent, if necessary, are mixed with a binder and a coating solvent, and the resulting composition is coated on the back surface of the support and dried. The order in which the magnetic and back coating layers are formed on the support is rather arbitrary and makes little difference.

Suitable additives for the back coating layer include, carbon black, graphite, talc, $Cr_2O_3$, $\alpha$-$Fe_2O_3$ (rouge), silicone oil and other lubricants, abrasive, antistatic agent, etc. The binder materials which are principally common to those used for magnetic coating layer but which are of thermosetting or reactive type are preferred. The content of inorganic additives can range from about 30 to 85 wt%, and more preferably from 40 to 80 wt%, and in the case of organic additives the content is from about 0.1 to 30 wt% and more preferably from 0.2 to 20 wt%. based on the total solid content in the back coating layer. The dried thickness of the back coating layer may range from about 0.5 to 5.0 microns but can be selected depending on the total thickness of the final magnetic tape, the application, the format, etc. For such back coating layers, reference can be made to, for example, Japanese Patent Publications Nos. 13411/1977 and 17401/1977, Japanese Patent Applications (OPI) Nos. 150407/1975, 8005/1977, 8006/1977, 17003/1977, 25603/1977, 30403/1977, 37405/1977, 40303/1977, and 40304/1977, Japanese Utility Models Nos. 6268/1977 and 8419/1977, Japanese Utility Model (OPI) Nos. 13411/1977 and 17401/1977, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 3,761,311, etc.

The magnetic coating composition is prepared by blending the necessary ingredients. At blending, the magnetic powder and the other ingredients cited above the charged in a mixing apparatus simultaneously or in turn. For example, a finely-divided ferromagnetic material may be added in a solvent containing a dispersing aid, and the resulting dispersion is subjected to blending operation for a pre-determined period. Various types of blenders or mixers can be used for the mixing and dispersion of the above-described ingredients to prepare magnetic coating mixtures, including two and three roll mills, ball mill, pebble mill, sand grinder, Szegvari attribot, high-speed impeller mixer, high-speed stone mill, high-speed impact mill, disper, kneader, high-speed mixer, homogenizer, ultrasonic dispersing device, etc. Techniques for kneading and dispersion are explained in "Paint Flow and Pigment Dispersion" by T. C. Patton (published by John Wiley & Sons,) Co., 1964) and also in U.S. Pat. Nos. 2,581,414 and 2,855,156.

Coating of magnetic coating composition on the support can be carried out by any of the following methods; air doctor coating, blade coating, air knife coating, squeezing coating, immersion coating, reverse roll coating, transfer roll coating, gravure coating, kiss coating, cast coating, spray coating, etc. Detailed descriptions on these and other coating methods are found in "Coating Engineering" pp. 253–277, Mar. 20, 1971. In the manufacture of a magnetic recording member of the present invention, any of these coating operations can be repeated successively more than once to make a multi-layer structure. Further, simultaneous multi-coating processes may be applied to the present invention. Such coating methods are set forth in Japanese Patent Application (OPI) Nos. 98803/1973 (corresponding to German OLS. No. 2,309,159) and 99233/1973 (corresponding to German OLS. No. 2,309,158), etc. For a double-layer structure of magnetic coating layer, the thickness ratio of upper and lower layers should be from about 1/1 to 166 on dry base.

Organic solvents used for coating include ketones such as acetone, methyl ethyl ketone, methyl isobutyl ketone, cyclohexanone, etc., alcohols such as methanol, ethanol, propanol, butanol, etc., esters such as methyl acetate, ethyl acetate, butyl acetate, ethyl lactate, glycolmonoethylether acetate, etc., ethers such as ether, glycol dimethylether, glycol monoethyl ether, dioxane, etc., aromatic hydrocarbons such as benzene, toluene, xylene, etc., chlorinated hydrocarbons such as methylene chloride ethylene chloride, carbon tetrachloride, chloroform, ethylene chlorohydrin, dichlorobenzene, etc.

The magnetic coating layer spread on the support is dried after an optional treatment of orienting the magnetic powder in the layer. Further, the coating product is subjected, if necessary, to surface smoothing processing, or slitting or cutting into the desired final product form. It has been confirmed that the surface smoothing processing applied to the magnetic coating layer is quite effective to obtain a uniform and highly abrasion resistant recording member in accordance with the instant invention.

To orient magnetic particles, a D.C. or A.C. magnetic field of an intensity of about 500 to 10,000 Oe is employed. The drying temperature for the magnetic coating layer ranges from about 50° to 120° C., more preferably from 70° to 100° C., and most preferably from 80° to 90° C., at an air flow rate of from about 1 to 5 kl/m$^2$, and more preferably from about 2 to 3 kl/m$^2$. The drying time is from about 30 seconds to 10 minutes, and more preferably from 1 to 5 minutes.

The orientation of the magnetic particles depends on the use. In the case of sound recording tape, home video tape, memory tape, etc., the direction is parallel to the longitudinal direction of the tape while for video tapes for broadcasting use the orientation is at an angle of from 30° to 90° with the travelling direction of the tape. Orienting methods for magnetic powders are set forth in the following patent specifications: U.S. Pat. Nos. 1,949,840, 2,796,359, 3,001,891, 3,172,776, 3,416,949, 3,473,960 and 3,681,138, Japanese Patent Publications Nos. 3427/1957, 28368/1964, 23624/1965, 23625/1965, 13181/1966, 13043/1973, and 39722/1973, etc. Besides, as is disclosed in German Patent (Deutsche Auslegeschrift) No. 1,190,983, the orienting direction may be different for the upper and lower layers in a multilayer structure.

Surface smoothing of the magnetic coating layer after drying can be achieved by calendering or by the use of smoothing sheet. Surface smoothing is desirably carried out via supercalendering whereby the magnetic recording member is passed between a pair of rolls consisting of a metallic roll and a cotton or plastic (e.g., nylon)

roll. Suitable calendering conditions are a calendering pressure of from about 25 to 100 kg/cm and more preferably from 30 to 70 kg/cm at a temperature of from about 35° to 100° C., and more preferably from about 40° to 80° C., at a calendering speed of from about 5 to 120 m/min. When the temperature and/or pressure exceeds the upper limit cited above, an adverse effect appears on the magnetic coating layer as well as the non-magnetizable, flexible support. On the other hand, with a calendering speed is below about 5 m/min, effective smoothing of the member surface does not result while above about 120 m/min, the processing is difficult to control. As for such surface smoothing operation, reference may be made to U.S. Pat. Nos. 2,688,567, 2,998,325 and 3,783,023, German Patent (OLS) No. 2,405,222, Japanese Patent Publications Nos. 53631/1974 and 10337/1975, etc.

The magnetic coating layer thus-produced contains about 75 to 90wt% (about 30 to 50% by volume) of ferromagnetic alloy powder and exhibits a residual magnetization of from about 2,500 to 4,000 Gauss in the direction of the movement between the magnetic head and the tape (which will be referred to as the "recording direction" hereinafter), Since in the application of analog audio recording by A.C. biasing the coercive force is desirably increased in proportion to residual magnetization in order to balance the improvements in recording/reproduction performance over the entire audio frequency range, the coercive force of the magnetic coating layer used in the present invention should be about 800 to 1,300 Oe.

Figure 2:
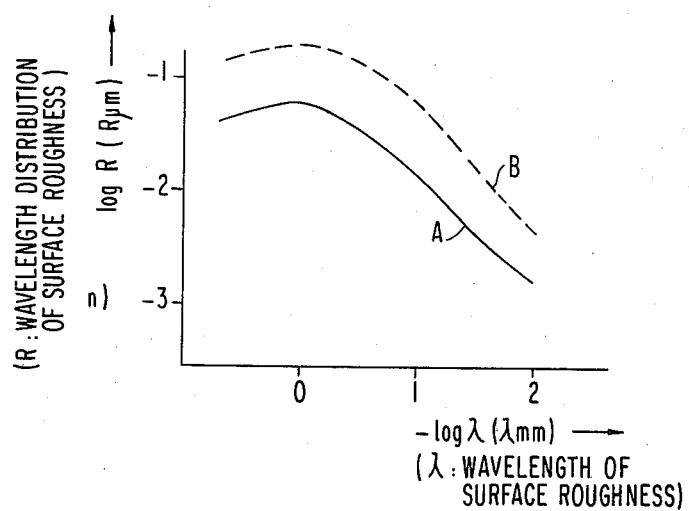
FIG. 2 is a graph of the wavelength distribution of surface roughness obtained by spectral analysis of the support of the present invention (A) and a conventional support (B).

FIG. 2 represents the surface roughness measurement with a tracing probe tye surface meter ("Surfcom EMO-S10A", a product of Tokyo Seimitsu Co.) on the surface 3 of the support 1 in FIG. 1 in the recording direction. The diagram depicts the wavelength distribution of the surface roughness obtained by analyzing (by a tracing probe type surface meter with Fourier Function Transformation analysis) the measured surface structure in the wavelength ($\lambda$, mm) region of $10^{-2}$ to 3.3 mm (i.e., from 0.3 to $10^2$ mm$^{-1}$ in wave number, (1/$\lambda$, mm$^{-1}$)) keeping the width of 1/$\lambda$ constant (0.3 mm$^{-1}$) by means of a spectrum analyzer (Spectrascope SD-335, a product of Spectral Dynamics Co.), and averaging the resulting values over the 12 mm support length.

As is shown by broken line B in FIG. 2, the wavelength distribution of the roughness for a support surface conventionally used for magnetic audio-recording tapes has a maximum in a wavelength region of the surface roughness greater than 500 $\mu$m (below 0.3 in - log$\lambda$), and the wavelength distribution of the roughness reduces as the wavelength decreases. Considering the thickness of the non-magnetizable, flexible support as being about 4 to 32 $\mu$m, one can attribute an observed wavelength distribution at wavelengths of 3 mm or more to the deformation of the support rather than the surface structure thereof.

In order to obtain a non-magnetizable flexible support with sufficiently smooth surfaces, the wavelength distribution of its surface roughness will generally resemble curve B. It should be noted that a support of such a surface structure is appropriate for audio recording. When a monotone of 6.3 KHz is recorded with A.C. biasing on a magnetic tape comprising a support having the surface characteristics shown by curve B, the reproduced sound includes modulating noise represented by curve D (broken line) in FIG. 3. This modulation noise, corresponding to frequency modulation component of the monotone output at 6.3 KHz, rapidly decreases for frequencies apart from the signal frequency. From an auditory viewpoint, sounds close to the frequency signal are hard to recognize (in other words, they are readily masked by the signal). Accordingly, the noise distribution in FIG. 3 can be considered not so unpleasant to the ear.

The surface of the support which characterizes the present invention has a wavelength distribution of surface roughness represented by the solid line A in FIG. 2. While curve B has a maximum wavelength distribution of 0.2 $\mu$m (log 0.2 = −0.7), curve A has a corresponding wavelength distribution of only 0.06 $\mu$m (log 0.06 = −1.22) in the wavelength region of surface roughness between 500 $\mu$m and 2.5 mm.

Figure 3:
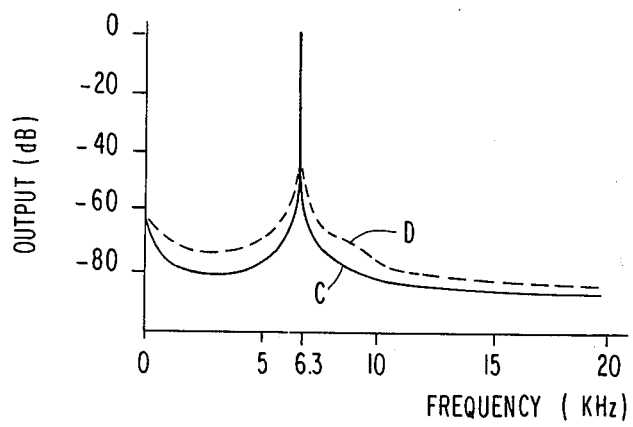
FIG. 3 is a graph of noise distribution for the magnetic recording material of the present invention (C) and a conventional material (D).

When a magnetic coating layer is provided on each of these supports, a noise spectrum as shown by curve D or C in FIG. 3 results. Solid line C, corresponding to curve A in FIG. 2, has a lower modulation noise than broken line D. For example, at a frequency of 6.8 KHz (0.5 KHz apart from the signal frequency of 6.3 KHz) the modulation noise is reduced by about 10 dB.

The modulation noise described above was measured at a tape speed v (mm/sec) of about 4.75 cm/sec customarily adopted for a Philips type compact cassette. More generally, for a magnetic fluctuation measured by Fourier Function transformation analysis at a wavelength $\lambda'$ (mm), signals are considered to be modulated with a frequency f' (= v/$\lambda'$). Accordingly, a 0.5 KHz signal modulation is regarded as being induced by a magnetic fluctuation with about 0.1 mm wavelength.

For the purpose of audio-recording to reproduce sounds favorable to the ear, it is desirable that the magnetic fluctuation has a maximum at the wavelength region such that the modulation frequency f' described above is less than 100 Hz and the magnetic fluctuation decreases at the wavelength region such that the modulation frequency is over 100 Hz. Accordingly, in the present invention the surface of the non-magnetic flexible support has a maximum value of the average wavelength distribution of the surface roughness, measured in recording direction over the length of more than 10 mm, at a frequency of the surface roughness not higher than 100 Hz when spectrally analyzed according to the following equation (1), and the maximum value of the average wavelength distribution in the frequency range of from 20 to 100 Hz is not higher than about 0.1 $\mu$m.

$$f = v/\lambda \tag{1}$$

wherein f is the frequency of the surface roughness in Hz, v is the relative velocity between the magnetic head and the tape in mm/sec, and $\lambda$ is the wavelength of the surface roughness in mm in recording direction.

One preferred embodiment of the present invention is a metal alloy audio-recording tape used for Philips type compact cassette with a tape speed of about 4.75 cm/sec, in which the surface of the non-magnetizable flexible support has a maximum value of the average wavelength distribution of the surface roughness, measured in the recording direction over a length of more than 10 mm, at a wavelength of the surface roughness not less than 475 $\mu$m (corresponding to a frequency of the surface roughness less than 100 Hz) and the maximum value of the average wavelength distribution in the wavelength region of from 475 $\mu$m to 2.3 mm (corresponding to the frequency range of from 20 to 100 Hz) is not higher than about 0.1 μm.

Solid lines A and C in FIGS. 2 and 3 have been obtained for the support and the metal alloy audio tape described in Example 1, while broken lines B and D are for the support and the audio tape in Comparative Example 1.

In Example 1 and Comparative Example 1, only the support film on which the same magnetic coating layer was provided by the same coating procedure is different. The roughness of the surface of the magnetic coating layer facing the magnetic head must, however, differ in the two examples, i.e., 0.07 μm in Example 1 and 0.16 μm in Comparative Example 1 as will be shown in Table 1. One can reasonably attribute this difference to the difference in the surface roughness of support surface.

From the above-cited result, it may be concluded as an additional advantage of the present invention that a wavelength distribution of the surface roughness of the surface of the metal alloy coating layer of the audio tape should not exceed 0.1 μm. Further, for the metal alloy magnetic audio-recording tape of the present invention the surface of magnetic coating layer facing the magnetic head desirably has a maximum value of the average wavelength distribution of the surface roughness, measured over a length of 10 mm or more in the recording direction, at a frequency of the surface roughness below 100 Hz when spectrally analyzed according to equation (1), and at the same time the maximum value of the average wavelength distribution in the frequency range of from 20 to 100 Hz does not exceed 0.1 μm.

The present invention will now be further illustrated by reference to the following examples and comparative examples. It is self-evident that the formulations, mixing ratios, the operational orders, etc., set forth herein can be modified within the scope of the present invention. Hence, the present invention is not limited to the following examples. In the description below all parts are by weight.

EXAMPLE 1

The following solutions were prepared.

|  | moles/liter |
| --- | --- |
| Solution M: |  |
| Ferrous Sulfate | 0.28 |
| Cobalt Chloride | 0.115 |
| Chrome Alum | 0.005 |
| (in an aqueous solution) |  |
| Solution R: |  |
| NaBH$_4$ (in 0.01 N NaOH solution) | 1.6 |

Under the application of 1,000 Oe D.C. magnetic field, 80 parts of solution M was agitated in a non-magnetizable reaction vessel, to which 20 parts of Solution R was added in 3 seconds to bring about reaction. The reaction finished in 2 minutes with the formation of a black, finely divided ferromagnetic alloy reaction product. After being separated from the mother liquor, this product was thoroughly washed with city water. The washed precipitate was vigorously stirred in a 0.1% sodium oleate aqueous solution for surface treatment. After repeated washings with water, the water was removed by centrifuging and the alloy powder was dried under vacuum at about 100° C. The product was finally removed by immersing in cyclohexanone, and designated P-1.

The thus-prepared ferromagnetic metal alloy powder P-1 had a saturation magnetization ($\sigma_s$) of 120 emu/g and a coercive force ($H_c$) of 1,020 Oe. Its particle size was about 300 Å with an average axial ratio (long axis length to short axis length) of about 5/1 and particles formed chain structures. An X-ray analysis revealed the composition of P-1 to be an amorphous alloy comprising $(Fe_{0.69}Co_{0.28}Cr_{0.03})_4B$.

| Magnetic Coating Composition | parts |
| --- | --- |
| Powder P-1 | 300 (dry weight) |
| Polyester-polyurethane resin (a reaction product of ethylene adipate and 2,4-tolylene diisocyanate, styrene equivalent mol. wt. = about 130,000) | 15 |
| Vinyl chloride/vinyl acetate/vinyl alcohol copolymer (copolymerization ratio: 91/3/6 in wt %, average degree of polymerization: 410 ± 30) | 17.5 |
| Rouge ($\alpha$-Fe$_2$O$_3$ having a particle size of about 0.2 to 0.5 μm) | 15 |
| Oleic Acid | 6 |
| Cyclohexanone | 300 |
| n-Butyl Acetate | 300 |

These ingredients were ball-milled for 10 hours, then 17.5 parts of Desmodur L-75, a product of Bayer A.G. (a 75% by wt., ethyl acetate solution of a triisocyanate compound which is an adduct of 3 moles of tolylene diisocyanate and 1 mole of trimethylolpropane with a mol. wt. of about 760 and NCO content of 13.3% by wt.) was added. The mixture was further dispersed under the application of high speed shearing force for 1 hour to form a magnetic coating composition.

On one surface of a 14 μm thick poly(ethylene terephthalate) film with a wavelength distribution of a surface roughness of 0.06 μm, the coating mixture thus prepared was spread so as to give a dried thickness of 3.5 μm. After being subjected to magnetic orientation in a 2,500 Gauss D.C. magnetic field for 0.02 second, the coated film was dried at 100° C. for 2 minutes. The dried magnetic web with a large width was supercalendered by passing through a pair of rolls comprising a metal roll (a backup roll of chrome plated steel) and a nylon calendering roll with a pressure of 50 kg/cm, at a speed of 30 m/min at 60° C. Then, the web was slit to about 3.8 mm width such that it could be used in a Philips type compact cassette. The resulting sample was designated T-1.

COMPARATIVE EXAMPLE 1

Using a 14 μm thick poly(ethylene terephthalate) film with a wavelength distribution of a surface roughness of 0.2 μm, the same magnetic coating mixture as in Example 1 was coated on the support to give a dried thickness of 3.5 μm by strictly repeating the procedures in the previous example. The metal alloy magnetic tape was designated CT-1.

The wavelength distribution of the surface roughness for each of these samples, T-1 and CT-1, is shown in FIG. 1, and the modulation noise thereof in FIG. 3.

EXAMPLE 2

A vacuum evaporation chamber charged with an ingot consisting of 95/5 mixture of Fe and Ni was evacuated to about $10^{-5}$ Torrs, and then the pressure was adjusted to 1 Torr by introducing Argon gas. Under such an atmospheric condition, the ingot was evaporated by means of radio frequency induction heating whereby a finely-divided black ferromagnetic alloy material was obtained. The chamber pressure was returned to atmospheric pressure (about 760 Torr) by slowly introducing air over 120 hours. After the addition of n-butyl acetate in two parts per 1 part of the powder, the product was collected. This alloy material was designated P-2.

The ferromagnetic alloy powder P-2 thus-prepared had a saturation magnetization ($\sigma_s$) of 141 emu/g and a coercive force ($H_c$) of 860 Oe. The particles formed a chain structure comprising granular unit particles with about 280 Å and with an average axial ratio of about 5. A chemical analysis confirmed that the powder consists of 86.0 wt% of Fe, 4.5 wt% of Ni and the remainder of metal oxides, moisture, etc., having a crystalline structure.

Using 2,300 parts of P-2, a magnetic coating composition was prepared as in Example 1, which was employed to produce an alloy magnetic tape T-2 in the same manner as Example 1.

COMPARATIVE EXAMPLE 2

With the use of P-2 set forth in Example 2, a comparative sample tape CT-2 was produced by following the procedures in Comparative Example 1.

EXAMPLE 3

Goethite ($\alpha$-FeOOH) which had absorbed cobalt was thermally treated at 450° C. to give an Fe-Co needle-shaped oxide product. Then at the same temperature gaseous hydrogen was fed onto the product to form an Fe-Co ferromagnetic alloy powder of needle form by reduction. The surface of this powder was treated with sodium oleate after cooling. The finished product was designated P-3 and had a saturation magnetization ($\sigma_s$) of 140 emu/g and a coercive force ($H_c$) of 950 Oe. The particle size along the longer axis was about 0.25 μm with an average axial ratio of 7. Chemical analysis disclosed the composition of P-3 to be 82.8% by wt. Fe, and 3.9% by wt. Co, with the remainder consisting of oxides of these metals, moisture, sodium oleate, etc.

By strictly following the procedures set forth in Example 1, a metal alloy type magnetic tape was prepared from a corresponding magnetic coating composition containing 3,300 parts of P-3 powder, except the dried thickness of the magnetic coating layer was made 3.2 μm. The resulting tape was designated T-3.

COMPARATIVE EXAMPLE 3

Sample tape CT-3 was produced having a dried thickness of 3.2 μm for the magnetic coating by the use of P-3 as in Example 3, but following the procedures set forth in Comparative Example 1.

The magnetic properties of the tapes prepared in the above examples were measured. The results of the measurements are summarized in Table 1 together with the information concerning tape thickness and surface structure, etc. As a standard, a $CrO_2$ cassette tape manufactured by BASF A.G. was tested. All the measurements were carried out with the use of the conventional chrome position equalizer (time constant for high frequency range playback: 70 microsec.).

TABLE 1 (No. 1)

| Sample No. | Tape Thickness | | | Wavelength Distribution of Surface Roughness | | Magnetic Properties | | | |
|---|---|---|---|---|---|---|---|---|---|
| | Total Thickness (μm) | Support Thickness (μm) | Magnetic Coating Thickness (μm) | Support (μm) | Magnetic Coating (μm) | Res. Magnetic Flux (Max/cm) | Resid. Magnetization (Gauss) | Coercive Force (Oe) | Square Ratio (Br/Bm) |
| CrO$_2$ | 17.5 | 11.0 | 6.5 | 0.20 | 0.16 | 0.78 | 1,200 | 480 | 0.82 |
| T-1 | 17.5 | 14.0 | 3.5 | 0.06 | 0.07 | 1.23 | 3,500 | 990 | 0.80 |
| CT-1 | 17.5 | 14.0 | 3.5 | 0.20 | 0.16 | 1.23 | 3,500 | 990 | 0.80 |
| T-2 | 17.5 | 14.0 | 3.5 | 0.06 | 0.06 | 1.25 | 3,560 | 940 | 0.72 |
| CT-2 | 17.5 | 14.0 | 3.5 | 0.20 | 0.16 | 1.25 | 3,560 | 940 | 0.72 |
| T-3 | 17.2 | 14.0 | 3.2 | 0.06 | 0.07 | 1.23 | 3,850 | 980 | 0.78 |
| CT-3 | 17.2 | 14.0 | 3.2 | 0.20 | 0.18 | 1.23 | 3,850 | 980 | 0.78 |

TABLE 1 (No. 2)

| Sample No. | Electromagnetic Transforming Properties* | | | | Modulation Noise Relative to 6.3 KHz, 0 dB Signal Output (dB) Modulation Frequencies (KHz) | | | | | |
|---|---|---|---|---|---|---|---|---|---|---|
| | Over Bias (dB) | MOL 333 Hz (dB) | MOL 10 KHz (dB) | Bias Noise Level (dB) | 0.2 | 0.5 | 1.0 | 2.0 | 4.0 | 8.0 |
| CrO$_2$ | 0.0 | −0.2 | −4.9 | −56.5 | −61 | −68 | −75 | −80 | −83 | −87 |
| T-1 | +2.6 | +4.2 | +7.2 | −56.0 | −63 | −70 | −76 | −81 | −84 | −87 |
| CT-1 | +2.7 | +4.1 | +6.7 | −56.2 | −51 | −60 | −67 | −72 | −79 | −83 |
| T-2 | +2.8 | +4.0 | +6.6 | −57.2 | −64 | −71 | −77 | −83 | −85 | −88 |
| CT-2 | +2.9 | +4.0 | +6.0 | −57.3 | −52 | −60 | −67 | −74 | −80 | −84 |
| T-3 | +2.3 | +4.5 | +8.3 | −55.1 | −61 | −69 | −75 | −80 | −83 | −86 |
| CT-3 | +2.4 | +4.4 | +7.6 | −55.3 | −48 | −58 | −64 | −70 | −77 | −81 |

*(a) Over-bias performance. The over-bias current expressed in terms of dB relative to the standard CrO$_2$ tape (made by BASF A.G.) which gives 0.5 dB lower power output than the peak output at the bias frequency of 4 KHz.
(b) MOL, 333 Hz. Ratio of response to 333 Hz signal with 3% 3rd harmonic distortion to that by a tape having a surface magnetic flux of 250 nWb/mm at 333 Hz.
(c) MOL, 10 KHz. Ratio of the saturation power output to 10 KHz signal to the standard one.
(d) Bias noise level. Ratio of bias noise power after passed through the weighting network (A curve) to the standard power output in dB.

From the results obtained by Examples and Comparative Examples, it is seen that the magnetic coating layer embodying the present invention can be made thinner (2 to 8 μm) than those of the conventional audio-recording tapes (3 to 12 μm) since the values of residual magnetization (Br) is relatively higher.

By virtue of the methods disclosed in the present invention, improvements in saturation response have been achieved by +4.4 dB in MOL, 333 Hz and by 12.1 dB in MOL, 10 KHz in comparison to conventional audio-recording tapes (e.g., $CrO_2$ cassette tape). On the other hand, bias noise level and modulation noise remain substantially unchanged or rather reduced. Hence, a marked expansion of dynamic range results over a broad frequency range. This dynamic range expansion is reflected also in the high fidelity of reproduced sounds from the auditory viewpoint.

Moreover, magnetic audio-recording tapes produced according to the present invention can be favorably used not only as Philips type compact cassette tapes with about 3.8 mm width and about 9 to 18 μm total thickness, but also as open reel tapes with a width of about 6.25 mm (¼ inches) and a total thickness of about 18 to 35 μm, as tapes for EL cassette, microcassettes and rear jet type endless cassette tapes, and still other cassette or cartridge tapes with various specifications.

While the invntion has been described in detail and with reference to specific embodiments thereof, it will be apparent to one skilled in the art that various changes and modifications can be made therein without departing from the spirit and scope thereof.

What is claimed is:

1. A magnetic audio-recording tape comprising a non-magnetizable flexible support and at least one magnetic coating layer provided on said support wherein (a) the support surface on which said magnetic coating layer is formed has a maximum value of an average wavelength distribution of surface roughness measured in the recording direction over the length of more than 10 mm at a wavelength of the surface roughness not less than 475 μm and at a frequency of the surface roughness not higher than 100 Hz when spectrally analyzed according to the following equation (1), and the maximum value of said wavelength distribution in the wavelength region of from 475 μm to 2.38 mm and the frequency range of from 20 Hz to 100 Hz is not higher than about 0.1 μm;

$$f = v/\lambda \tag{1}$$

wherein f is the frequency of the surface roughness in Hz, v is the relative velocity between the magnetic head and the tape in mm/sec, and λ is the wavelength of the surface roughness in mm in the recording direction, and (b) said magnetic coating layer comprises a finely divided ferromagnetic alloy material dispersed in a binder.

2. The magnetic recording tape of claim 1, wherein said non-magnetizable flexible film support has a thickness of about 4 to 32 μm.

3. The magnetic audio-recording tape of claim 1, wherein a wavelength distribution of the roughness of the surface brought into contact with the magnetic head does not exceed about 0.1 μm.

4. The magnetic audio-recording tape of claim 1, wherein the thickness of the magnetic coating layer is about 2 to 8 μm.

5. The magnetic audio-recording tape of claim 1, wherein said magnetic coating layer contains from about 75 to about 90% by weight of said ferromagnetic alloy and has a residual magnetization of about 2,500 to 4,000 Gauss in the recording direction of the tape.

6. The magnetic audio-recording tape of claim 1, wherein said magnetic coating layer has a coercive force of from about 800 to about 1,300 Oe.

7. The magnetic audio-recording tape of claim 1, wherein said finely-divided ferromagnetic alloy material has a mean short axis particle size not longer than about 500 Å and a mean axial ratio of not less than about 3, the metal content thereof is not less than about 75 wt%, and more than about 80 wt% of said metal content comprises at least one metal element selected from the group consisting of Fe, Co and Ni.

* * * * *